L. C. AND E. G. WOOD.
DISH WASHING MACHINE.
APPLICATION FILED MAR. 23, 1921.
1,395,324.
Patented Nov. 1, 1921.
2 SHEETS—SHEET 2.
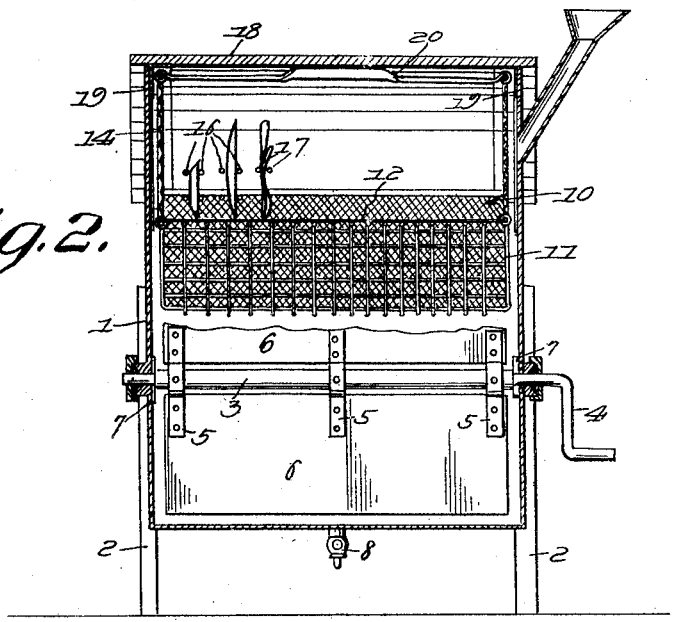
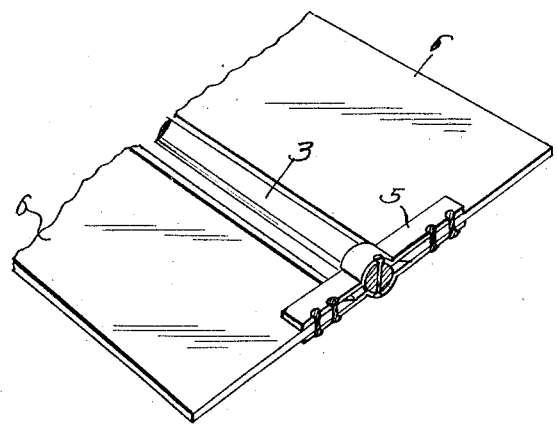
Inventor
Leola C. Wood,
E. G. Wood,
By Watson E. Coleman,
Attorney

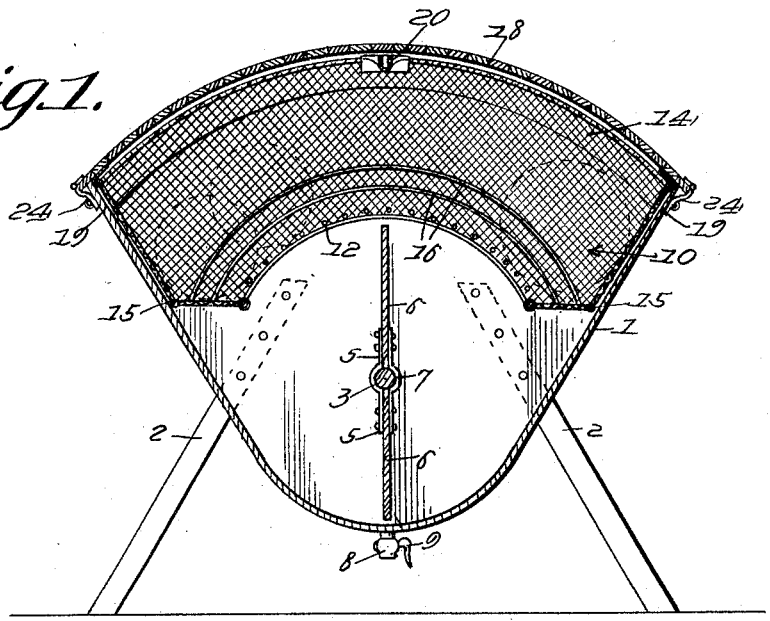
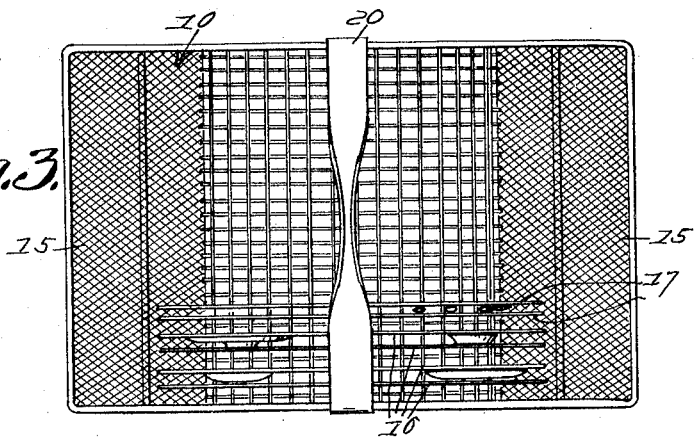

UNITED STATES PATENT OFFICE.

LEOLA C. WOOD AND ELIJAH G. WOOD, OF REBECCA, GEORGIA.

DISH-WASHING MACHINE.

1,395,324. Specification of Letters Patent. Patented Nov. 1, 1921.

Application filed March 23, 1921. Serial No. 454,665.

*To all whom it may concern:*

Be it known that we, LEOLA C. WOOD and ELIJAH G. WOOD, citizens of the United States, residing at Rebecca, in the county of Turner and State of Georgia, have invented certain new and useful Improvements in Dish-Washing Machines, of which the following is a specification, reference being had to the accompanying drawings.

It is the purpose of the present invention to provide a machine of this character wherein the dishes, knives, forks and spoons, drinking glasses, cups and the like are placed in a basket contained in a suitable casing above the washing fluid, whereby upon agitating the fluid it is slushed or thrown upon the dishes for the purpose of cleaning the same.

Another purpose is to provide a machine of this design, in which an arcuate dish containing basket is employed, including means for supporting the dishes on their edges upon transversely disposed wires of the basket, so that as the washing fluid is agitated, it may easily and quickly reach the dishes for removing the dirt and grease, and as the fluid is hot, the steam rises, thereby sterilizing the dishes.

Still another purpose is to provide a simple, efficient and practical machine, which may be operated by hand or motive power, and which may be manufactured for a relatively low cost.

Still a further purpose is to provide a machine of this character, including an arcuate basket, with arcuate rods conforming to the curved shape of the basket for supporting the dishes upon edge and upon transversely supporting wires, there being additional closely spaced arcuate rods for holding knives, forks and spoons, there being a portion of the interior of the basket over the transverse rods, left plain, for the support of cups, drinking glasses and the like, so that they may be thoroughly cleansed.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combinations of parts, as will be hereinafter set forth, shown in the drawings and claimed.

In the drawings:—

Figure 1 is a vertical sectional view through the improved dish washing machine, constructed in accordance with the invention.

Fig. 2 is a vertical sectional view at right angles to Fig. 1, showing the construction of the basket, which contains the dishes.

Fig. 3 is a plan view of the dish containing basket removed from the washing machine casing, clearly disclosing the means for supporting the dishes therein.

Fig. 4 is a view showing the construction of the agitator.

Referring to the drawings, 1 designates a casing or tank which may be any suitable shape or configuration, constructed of any suitable material, preferably galvanized iron or the like, and as the tank or casing is preferably of the shape shown, it is supported upon legs 2, which may be disposed in any suitable position preferably diverging downwardly as shown.

Mounted in the tank or receptacle is a shaft 3, provided with a crank 4, whereby the shaft may be rotated, though it is obvious that the crank may be dispensed with, and in lieu thereof a suitable driving pulley (not shown) may be applied, so the power from any suitable mechanical source may be applied for driving the shaft.

Mounted upon the shaft 3 and secured by metallic strips 5 are agitating blades 6. These blades extend radially from the shaft, and the metallic strips are provided with semi-circular curved portions, engaging about the shaft, whereby the blades may be clamped in position. Suitable washers 7 are interposed between the ends of the agitating blades and the sides of the tank or casing, to prevent the agitating blades from contacting with the inner surface of the tank.

The upper wall of the tank or receptacle is of arcuate form, and engaging in the receptacle or tank is a suitable dish containing basket 10, preferably constructed of wire mesh or fabric suitable for this purpose. In fact the basket includes a frame 11 constructed of relatively heavier wire than the mesh work or fabric. This frame is of arcuate form, and the lower arcuate wires or rods are connected by transversely disposed supporting wires 12, acting as supports, in fact as a bottom for the receptacle, to support the dishes.

It will be noted that since the basket or receptacle is of arcuate form conforming to the shape of the tank, the end fabric walls 14 of the basket rest upon the diverging walls 15 of the tank or receptacle, thereby supporting the basket, in such wise that the agitator blades are free to rotate without contacting with the bottom of the basket. The blades in rotating will agitate the water and splash the same upon the dishes above the transverse wires.

Connecting the diverging end walls of the basket and arranged in arcuate form corresponding to the contour of the basket are spaced rods 16, between which the dishes, such as plates, saucers and large platters are supported on their edges, so that their edge portions may rest upon the transverse wires of the basket. Additional spaced rods 17 of arcuate form conforming to the contour of the basket also connect the end walls of the basket, and these arcuate wires or rods are provided for the purpose of receiving therebetween knives, forks and spoons. A portion of the bottom of the basket is left plain, on which other dishes such as cups, bowls, glasses and deep vegetable dishes may be supported, with their bottoms facing upwardly, so that their interiors may be easily and very quickly washed by the agitated washing fluid. The transverse supporting wires of the bottom of the basket are connected and held in relatively spaced positions by means of arcuately extending wires.

The casing is provided with a cover, which is of arcuate form conforming to the curvature of the tank. This cover, though it is constructed of transversely disposed boards or strips may be constructed entirely of galvanized iron. Nevertheless this cover 18 is provided with a marginal flange 19 extending between the dish holding basket and the wall of the tank, thereby spacing the basket from the surface of the tank.

When inserting the basket in the receptacle, the cover 18 is first removed, or tilted on one side or the other, after which the basket is placed over and partly in the receptacle, then the cover 18 is placed so that one end of the wire rod around the upper margin of the basket may contact with the end of the marginal flange 19, then the cover is gradually lowered with the basket, keeping the flange between one end of the basket, then when the cover is about to engage the other end of the receptacle the basket is sprung in engagement with the other end portion of the flange 9, and the cover finally lowered. If desired the cover may be first entirely detached from the receptacle, and then the basket may be partly contracted about its upper margin and forced into engagement with the marginal flange 19, then the cover and the basket may be placed in the receptacle as one body, therefore in this way the cover is placed over the sides of the receptacles.

The basket is provided with a transverse bar 20, which acts as a base between the sides of the basket, and also constitutes a handle, by which the basket may be lifted from the tank or receptacle, when it is desired to remove the dishes, after they have been thoroughly steamed or sterilized.

The bottom of the tank or receptacle is provided with a drain pipe 8 having a drain cock 9 so that the dirty or soiled water may be drawn off.

A suitable filling pipe 23 is connected to one end wall of the tank or receptacle at a point above the level of the small amount of water, for refilling the tank. This filling tube is provided with a funnel shaped end, so as to permit the clear hot water to be poured therethrough.

The filling tube not only permits the tank to be filled, but it also acts as means to permit the steam to escape. The legs are bolted to the tank, so that they can be easily renewed or replaced by others. The cover which is common to the tank and the basket has suitable catches or latches 24, to hold the cover in place on the tank or receptacle.

As soon as the dishes are washed, the drain cock on the drain pipe may be opened and the dirty or soiled water allowed to escape. The drain cock is then closed, and rinsing water is poured into the tank through the filling tube. This water is then agitated by the propeller blades, by turning the crank or imparting motion to the shaft by any other suitable means, so that the plain water may be splashed upon and sterilize the dishes. The cover is then removed, and then the rinsing water is drained off, after which the steam will instantly disappear, and the dishes will drain and thoroughly dry.

The invention having been set forth, what is claimed as being useful is:

1. In a dish washing machine, a tank for the reception of cleaning fluid provided with agitating means for agitating the fluid, a dish receiving basket being of a shape to fit and mounted within the tank, arcuate spaced rods for the reception of dishes therebetween to support the dishes on their edges upon the bottom of the basket, and a cover common to the tank and the basket and having means engaging between the basket and the wall of the tank, to space the basket from the inner surface of the tank.

2. In a dish washing machine, a tank adapted to contain a washing fluid, agitating means in the bottom of the tank, said tank having upwardly diverging end walls, a basket being of a shape to fit and mounted within the tank and provided with upwardly diverging end walls to engage the end walls of the tank, whereby the basket may be supported in position above the fluid, and a cover common to the tank and the basket and having a marginal flange adapted to fit between the ends of the basket and the tank.

3. In a dish washing machine, a tank adapted to contain a washing fluid, agitating means in the lower portion of the tank, a basket mounted in the tank for the reception of dishes, the greater portion of the bottom of the basket being of arcuate shape to arch over the agitating means, spaced rods connected to the ends of the bottom of the basket and being of arcuate form to conform to the arcuate portion of the bottom of the basket, and adapted to support dishes therebetween, and a cover common to the tank and the basket for closing the opening to the tank, and means on the cover, adapted to be interposed between the walls of the basket and the tank to space the basket in position in the tank.

In testimony whereof we hereunto affix our signatures.

LEOLA C. WOOD.
ELIJAH G. WOOD.